United States Patent
Boer et al.

(10) Patent No.: US 11,885,654 B2
(45) Date of Patent: Jan. 30, 2024

(54) ULTRASONIC FLOWMETER, USE OF AN ULTRASONIC FLOWMETER IN A SHUT-OFF DEVICE AND SHUT-OFF DEVICE

(71) Applicant: FOCUS-ON V.O.F., Dordrecht (NL)

(72) Inventors: Adriaan Hendrik Boer, Sliedrecht (NL); Kavreet Bhangu, Bruckmühl (DE); Jeroen Martin van Klooster, Tiel (NL)

( * ) Notice: Subject to any disclaimer, the term of this patent is extended or adjusted under 35 U.S.C. 154(b) by 0 days.

(21) Appl. No.: 16/894,406

(22) Filed: Jun. 5, 2020

(65) Prior Publication Data

US 2020/0386595 A1     Dec. 10, 2020

(30) Foreign Application Priority Data

Jun. 7, 2019   (EP) .................... 19179102.9

(51) Int. Cl.
| | | |
|---|---|---|
| *G01F 1/66* | (2022.01) | |
| *F16K 37/00* | (2006.01) | |
| *G01F 15/00* | (2006.01) | |
| *G01F 1/667* | (2022.01) | |
| *G01N 29/22* | (2006.01) | |
| *G01N 29/02* | (2006.01) | |

(52) U.S. Cl.
CPC .......... *G01F 1/662* (2013.01); *F16K 37/0066* (2013.01); *G01F 1/667* (2013.01); *G01F 15/005* (2013.01); *G01N 29/02* (2013.01); *G01N 29/222* (2013.01); *G01N 29/223* (2013.01)

(58) Field of Classification Search
CPC ........ G01F 1/662; G01F 15/005; G01F 1/667; G01N 29/222; G01N 29/02; G01N 29/223
See application file for complete search history.

(56) References Cited

U.S. PATENT DOCUMENTS

| | | |
|---|---|---|
| 2006/0288798 A1 | 12/2006 | Kroemer et al. |
| 2008/0141786 A1* | 6/2008 | von Klooster .......... G01F 1/667 73/861.25 |
| 2012/0090702 A1 | 4/2012 | Shalev |

(Continued)

FOREIGN PATENT DOCUMENTS

| | | |
|---|---|---|
| DE | 102007004936 B4 | 1/2011 |
| DE | 102013218827 A1 | 3/2014 |

*Primary Examiner* — Benjamin R Schmitt
(74) *Attorney, Agent, or Firm* — Patrick D. Duplessis

(57) ABSTRACT

An ultrasonic flowmeter includes a measuring tube, a first transducer pair including first and second ultrasonic transducers, and a second transducer pair including third and fourth ultrasonic transducers. Each ultrasonic transducer is an ultrasonic transmitter and/or an ultrasonic receiver. The first transducer pair is on the measuring tube offset such that the respective transmitter transmits an ultrasonic signal in or against the direction of flow, and the receiver receives the ultrasonic signal. A course of the ultrasonic signal between the first and second ultrasonic transducers defines a first signal path. The second transducer pair is on the measuring tube offset such that the respective transmitter transmits an ultrasonic signal in or against the direction of flow. The receiver receives the ultrasonic signal transmitted by the transmitter. A course of the ultrasonic signal between the third and fourth ultrasonic transducers defines a second signal path.

20 Claims, 3 Drawing Sheets

(56) References Cited

U.S. PATENT DOCUMENTS

2013/0304403 A1* 11/2013 Dam .................... G01N 29/222
  702/48
2018/0321067 A1 11/2018 Kroemer et al.

* cited by examiner

ULTRASONIC FLOWMETER, USE OF AN ULTRASONIC FLOWMETER IN A SHUT-OFF DEVICE AND SHUT-OFF DEVICE

TECHNICAL FIELD

The invention is based on an ultrasonic flowmeter with at least one measuring tube, with at least one first ultrasonic transducer pair comprising a first ultrasonic transducer and a second ultrasonic transducer and with at least one second ultrasonic transducer pair comprising a third ultrasonic transducer and a fourth ultrasonic transducer, wherein each ultrasonic transducer is designed as an ultrasonic transmitter and/or as an ultrasonic receiver, wherein the first ultrasonic transducer pair is arranged on the measuring tube offset as viewed in the direction of flow such that the respective transmitter transmits an ultrasonic signal in the direction of flow or against the direction of flow during operation, and that the receiver receives the ultrasonic signal transmitted by the transmitter, wherein the course of the ultrasonic signal between the first ultrasonic transducer and the second ultrasonic transducer defines a first signal path, wherein the first signal path define a first measuring plane, wherein the second ultrasonic transducer pair is arranged on the measuring tube offset as viewed in the direction of flow such that the respective transmitter transmits an ultrasonic signal in the direction of flow or against the direction of flow during operation, and that the receiver receives the ultrasonic signal transmitted by the transmitter, wherein the course of the ultrasonic signal between the third ultrasonic transducer and the fourth ultrasonic transducer defines a second signal path, wherein the second signal path defines a second measuring plane, wherein the measuring tube has at least one measuring tube cross-sectional area and a measuring tube axis, and wherein the measuring tube comprises a first measuring tube half and a second measuring tube half.

BACKGROUND

Furthermore, the invention relates to the use of an ultrasonic flowmeter in a shut-off device, wherein the shut-off device has a flow channel and a blocking device arranged in the flow channel, wherein the blocking device has a blocking body receptacle and a blocking body movable in the blocking body receptacle, wherein the flow cross-section for the medium in the blocking device and thus in the flow channel can be changed by moving the blocking body in the blocking body receptacle, wherein the flow channel has an inlet region upstream of the blocking device as viewed in the direction of flow.

In addition, the invention also relates to a shut-off device with an ultrasonic flowmeter, wherein the shut-off device has a flow channel and a blocking device arranged in the flow channel, wherein the blocking device has a blocking body receptacle and a blocking body movable in the blocking body receptacle, wherein the flow cross-section for the medium in the blocking device and thus in the flow channel can be changed by moving the blocking body in the blocking body receptacle, wherein the flow channel has an inlet region upstream of the blocking device as viewed in the direction of flow.

The measurement of the flow of a medium flowing through a measuring tube with an ultrasonic flowmeter is known from the state of the art. Ultrasonic flowmeters generally have a measuring tube and at least two ultrasonic transducers designed as ultrasonic transmitters and/or ultrasonic receivers, which are arranged on the measuring tube at a distance from each other in the direction of flow (axially in relation to the measuring tube axis). To measure the flow rate, an ultrasonic signal is transmitted along the signal path between the ultrasonic transducers both in the direction of flow and against the direction of flow. Due to the entrainment effect, there is a different transit time from the signals moving along a signal path with or against the flow. The difference in transit time is used to determine the flow velocity and, taking the measuring tube cross-section into account, the volume flow rate.

Ultrasonic flowmeters are also known that have more than one ultrasonic transducer pair, so that two or more signal paths can be evaluated to determine the flow rate.

For example, the document DE 10 2007 004 936 B4 discloses an ultrasonic flowmeter with at least two pairs of ultrasonic transducers, wherein the ultrasonic transducers of each ultrasonic transducer pair are arranged on a common half of the measuring tube offset to each other in the longitudinal direction of the measuring tube, and the ultrasonic reflector associated with the respective ultrasonic transducer pair is arranged on the other half of the measuring tube between the two ultrasonic transducers, viewed in the longitudinal direction of the measuring tube, so that an ultrasonic signal transmitted by one ultrasonic transducer of an ultrasonic transducer pair passes along a V-shaped signal path via the ultrasonic reflector associated with the ultrasonic transducer pair to the other ultrasonic transducer of the ultrasonic transducer pair, wherein the first ultrasonic transducer pair and the second ultrasonic reflector are arranged on one circumferential half and the second ultrasonic transducer pair and the first ultrasonic reflector are arranged on the other circumferential half. The ultrasonic transducer pairs are arranged in such a way that the measuring planes spanned by the individual signal paths run parallel to one another.

In addition, it is known from the document DE 10 2013 218 827 A1 that ultrasonic flowmeters for flow measurement are provided on or in the housing of a shut-off device so that the volume or mass flow can be controlled based on the measured flow.

Especially in shut-off devices, but also in other fields of use, there is often the problem that bends or cross-sectional changes of the measuring tube cause irregularities in the flow profile, which lead to inaccuracies in the flow measurement at the measuring site. In detail, e.g. vortices present in the flowing medium to be measured generate radial and tangential velocity components which falsify the measurement of the velocity of the flowing medium. It is particularly problematic if the measuring site is located immediately in front of or behind or in the vicinity of such areas causing a disturbance of the flow profile.

SUMMARY

Based on the state of the art as presented, it is therefore the object of the invention to provide an ultrasonic flowmeter which allows a particularly reliable flow measurement even in critical fields of use. Furthermore, it is the object of the invention to provide the use of such a flowmeter in a shut-off device and a corresponding shut-off device.

According to a first teaching of the present invention, the previously described object is achieved by an ultrasonic flowmeter mentioned at the beginning in that the measuring tube exhibits a change in the shape and/or size of the measuring tube cross-sectional area in the course of the first signal path and the second signal path, that the first ultrasonic transducer is arranged on the first half of the measuring tube and that the third ultrasonic transducer is arranged on the second half of the measuring tube, that the first ultrasonic transducer pair and the second ultrasonic transducer pair are arranged on the measuring tube such that the first measuring plane and the second measuring plane are not aligned parallel to one another.

It was recognized that, due to the arrangement of the ultrasonic transducer pairs according to the invention, a flowing medium can be measured particularly reliably even in areas where the shape and/or size of the measuring tube cross section changes, whereby vortices disturbing the flow measurement occur.

Radial or tangential velocity components causing errors can be filtered out particularly advantageously by sending a first ultrasonic signal along the first signal path and a second ultrasonic signal along the second signal path into the medium from different directions, preferably at substantially equal but opposite angles with respect to the measuring tube axis. For this, the first ultrasonic transducer is arranged on the first half of the measuring tube and the third ultrasonic transducer is arranged on the second half of the measuring tube.

The first half of the measuring tube and the second half of the measuring tube are each formed by a first and a second circumferential half extending in the longitudinal direction of the measuring tube.

In addition, the individual ultrasonic transducers are aligned such that the first measuring plane defined by the first signal path and the second measuring plane defined by the second signal path do not run parallel to one another, so that the distance between the first measuring plane and the second measuring plane decreases at least in sections along the measuring tube axis and/or so that the distance increases at least in sections along the measuring tube axis. According to the invention, the arrangement of the ultrasonic transducers is adapted to the change of the measuring tube in the course of the measuring section, preferably such that, with respect to the flow profile, the areas in which resulting vortices have only minor effects are detected during operation and, furthermore, the determination of the velocity of a turbulent or laminar flow profile has the smallest possible error.

According to a particularly preferred design, the first signal path defines exactly a first measuring plane and the second signal path defines exactly a second measuring plane.

In an advantageous way, the first ultrasonic transducer pair and the second ultrasonic transducer pair are arranged within the same measuring tube section, thus ensuring a particularly space-saving arrangement.

Furthermore, the ultrasonic flowmeter has a control and evaluation unit which determines the flow of a flowing medium based on at least the two ultrasonic signals.

According to a further design, the first ultrasonic transducer pair and the second ultrasonic transducer pair are arranged on the measuring tube such that, in the course of the measuring section between the ultrasonic transducers, the distance of the first measuring plane to the measuring tube axis essentially corresponds to the distance of the second measuring plane to the measuring tube axis.

Thus, preferably at any point of the measuring tube axis, the distance of the first measuring plane to the measuring tube axis is substantially as large as the distance of the second measuring plane to the measuring tube axis.

According to a further design, the ultrasonic transducers are arranged such that the distance between the first measuring plane and the second measuring plane is reduced at least in sections along the measuring tube axis. In particular, the first measuring plane and the second measuring plane do not intersect in the area of the measuring section between the ultrasonic transducers.

According to a next design, the ultrasonic transducers are arranged such that the distance between the first measuring plane and the second measuring plane increases at least in sections along the measuring tube axis.

According to a next design, the first signal path and the second signal path have at least one reflecting surface.

The reflecting surface(s) can be formed by reflection elements inserted into the measuring tube and/or by the measuring tube itself. Depending on the design of the signal paths, the reflecting surface(s) can be at least partially set back in relation to the inner wall of the measuring tube and/or project into the measuring tube interior and/or be formed flush with the inner wall of the measuring tube.

According to another advantageous further development of the ultrasonic flowmeter, the first signal path and the second signal path are essentially V-shaped.

Particularly preferably, the first ultrasonic transducer pair and the second ultrasonic transducer pair are arranged such that the first signal path and the second signal path form two crossed V-shaped signal paths, for example in plan view from above of the measuring tube, whereby the two signal paths or the measuring planes within the measuring section between the ultrasonic transducers do not intersect or touch each other. For this, the first ultrasonic transducer pair and the reflecting surface of the second signal path are arranged on the first half of the measuring tube and the second ultrasonic transducer pair and the reflecting surface of the first signal path are arranged on the second half of the measuring tube.

According to another advantageous design, the first ultrasonic transducer pair and the second ultrasonic transducer pair are arranged such that the first signal path and the second signal path measure the flowing medium at a distance $r=0.5$ R or $r>0.3$ R or $r>0.5$ R, where R is the respective radius of the measuring tube cross-section in the course of the measuring section. The radius R can change in the course of the measuring section.

According to a next further training the first ultrasonic transducer pair is arranged on the first half of the measuring tube and the second ultrasonic transducer pair is arranged on the second half of the measuring tube. According to this design, the first signal path and the second signal path can be V-shaped or each have a plurality of reflections.

According to another design, the measuring tube has a reduction in cross-section, i.e. a reduction in the measuring tube cross-sectional area, in the course of the first signal path and the second signal path. The size of the measuring tube cross-sectional area decreases particularly preferentially in the course of the measuring section between the ultrasonic transducers by at least 10% and/or by at most 30% and/or by about 20%.

Alternatively, the measuring tube can also have a cross-sectional expansion, i.e. an increase in the measuring tube cross-sectional area, in the course of the first signal path and the second signal path.

According to a next design, the cross-sectional area of the measuring tube in the area of the first ultrasonic transducer and the third ultrasonic transducer or in front of the first and the third ultrasonic transducer is essentially round and the cross-sectional area of the measuring tube in the area of the second ultrasonic transducer and the fourth ultrasonic transducer is essentially oval. In the context of the present invention, an oval configuration is preferably understood to mean any roundish convex shape which resembles the shape of an egg in the broadest sense.

According to one design, the measuring tube cross-section has a height and a width. Particularly preferably the height of the measuring tube cross-section decreases continuously in the course of the measuring section between the ultrasonic transducers and/or the width of the measuring tube cross-section increases continuously in the course of the measuring section between the ultrasonic transducers. Preferably, the decrease in height is greater than the increase in width.

Alternatively, the height or the width of the measuring tube cross-section can be essentially unchanged in the course of the measuring section, wherein the respective other, not unchangeable parameter width or height increases or decreases. Alternatively, both the height and the width of the measuring tube cross-section can decrease in the course of the measuring section.

The first signal path and the second signal path preferably run in the range 0.5 R above and below the measuring tube axis, respectively, where R is the respective radius which changes in the course of the measuring section, or, in the case of an oval shape, where R corresponds to half the height of the measuring tube cross-section. Alternatively, the first and the second signal path can also be arranged continuously at an equal distance from the measuring tube axis, wherein the distance is less than 0.5 R or greater than 0.5 R and wherein R is the respective radius that changes in the course of the measuring section or, in the case of an oval shape, R corresponds to half the height of the measuring tube cross-section.

According to a further design, the measuring tube cross-sectional area has at least a first circular arc and a second circular arc, wherein the radius of the first circular arc and the second circular arc increase continuously in the course of the measuring section between the ultrasonic transducers.

Preferably, the radius of the first circular arc becomes larger faster than the radius of the second circular arc, so that the measuring tube cross-section in the area of the first circular arc flattens out in the course of the measuring section.

According to the next design, the second circular arc in the course of the measuring section between the ultrasonic transducers continuously corresponds essentially to a semicircle.

The ultrasonic transducers are preferably arranged on the measuring tube such that the first and second signal path are not or not completely in the widening or flattening area of the measuring tube. In these areas, mass transport takes place perpendicular to the direction of flow of the medium, which promotes the formation of vortices in these areas. By avoiding these areas during operation, the accuracy of the determination of the velocity of the medium can be further improved.

In principle, the change in the shape and/or size of the measuring tube cross-sectional area is adapted to the particular application of the ultrasonic flowmeter.

According to a next advantageous design, the first ultrasonic transducer of the first ultrasonic transducer pair and the third ultrasonic transducer of the second ultrasonic transducer pair are arranged on the circumference of a first cross-sectional area of the measuring tube and the second ultrasonic transducer of the first ultrasonic transducer pair and the fourth ultrasonic transducer of the second ultrasonic transducer pair are arranged on the circumference of a second cross-sectional area of the measuring tube. This design ensures that the flowing medium is detected within a section of the measuring tube, which is particularly advantageous in the case of flow profiles that change due to variation of the measuring tube.

A further design feature of the flowmeter is that the measuring tube axis is curved at least in sections. Accordingly, the measuring tube is also curved at least in sections. This makes the flowmeter particularly suitable for use, for example, in the inlet region of a shut-off device, where the flow pattern is typically optimized by shaping the inlet region accordingly.

According to a second teaching of the present invention, the object mentioned above is achieved by the use of an ultrasonic flowmeter in a shut-off device as described above in that the ultrasonic flowmeter has at least one measuring tube, at least one first ultrasonic transducer pair comprising a first ultrasonic transducer and a second ultrasonic transducer and at least one second ultrasonic transducer pair comprising a third ultrasonic transducer and a fourth ultrasonic transducer, wherein each ultrasonic transducer is designed as an ultrasonic transmitter and/or as an ultrasonic receiver, that the first ultrasonic transducer pair is arranged on the measuring tube offset as viewed in the direction of flow such that, during operation, the respective transmitter transmits an ultrasonic signal in the direction of flow or against the direction of flow, and that the receiver receives the ultrasonic signal transmitted by the transmitter, wherein the course of the ultrasonic signal between the first ultrasonic transducer and the second ultrasonic transducer defines a first signal path, wherein the first signal path defines a first measuring plane, that the second ultrasonic transducer pair is arranged on the measuring tube offset as viewed in the direction of flow such that, during operation, the respective transmitter transmits an ultrasonic signal in the direction of flow or against the direction of flow, and that the receiver receives the ultrasonic signal transmitted by the transmitter, wherein the course of the ultrasonic signal defines a second signal path between the third ultrasonic transducer and the fourth ultrasonic transducer, wherein the second signal path defines a second measuring plane, that the measuring tube of the ultrasonic flowmeter is formed at least as part of the flow channel, that the measuring tube has at least one measuring tube cross-sectional area and a measuring tube axis, that the measuring tube comprises a first half of the measuring tube and a second half of the measuring tube, that the measuring tube exhibits a change in the shape and/or size of the measuring tube cross-sectional area in the course of the first signal path and the second signal path, that the first ultrasonic transducer is arranged on the first half of the measuring tube and that the third ultrasonic transducer is arranged on the second half of the measuring tube, that the first ultrasonic transducer pair and the second ultrasonic transducer pair are arranged on the measuring tube such that the first measuring plane and the second measuring plane are not aligned parallel to one another.

According to a particularly preferred design, the ultrasonic flowmeter is designed according to one of the previously described configurations.

The design of the ultrasonic flowmeter according to the invention ensures reliable determination of the flow rate of a flowing medium, particularly in the case of different positions of the movable blocking body, which also have an effect on the shape of the flow cross-section in the flow channel, which also improves the functioning of the shut-off device.

According to a third teaching of the present invention, the object described at the beginning is achieved by a shut-off device with an ultrasonic flowmeter, in that has at least one measuring tube, at least one first ultrasonic transducer pair comprising a first ultrasonic transducer and a second ultrasonic transducer and at least one second ultrasonic transducer pair comprising a third ultrasonic transducer and a fourth ultrasonic transducer, wherein each ultrasonic transducer is designed as an ultrasonic transmitter and/or as an ultrasonic receiver,

- that the first ultrasonic transducer pair is arranged on the measuring tube offset as viewed in the direction of flow such that the respective transmitter transmits an ultrasonic signal in the direction of flow or against the direction of flow during operation, and that the receiver receives the ultrasonic signal transmitted by the transmitter, wherein the course of the ultrasonic signal between the first ultrasonic transducer and the second ultrasonic transducer defines a first signal path, wherein the first signal path defines a first measuring plane,
- that the second ultrasonic transducer pair is arranged on the measuring tube offset as viewed in the direction of flow such that the respective transmitter transmits an ultrasonic signal in the direction of flow or against the direction of flow during operation, and that the receiver receives the ultrasonic signal transmitted by the transmitter, wherein the course of the ultrasonic signal defines a second signal path between the third ultrasonic transducer and the fourth ultrasonic transducer, wherein the second signal path defines a second measuring plane,
- that the measuring tube of the ultrasonic flowmeter is formed at least as part of the flow channel,
- that the measuring tube has at least one measuring tube cross-sectional area and a measuring tube axis,
- that the measuring tube comprises a first half of the measuring tube and a second half of the measuring tube,
- that the measuring tube exhibits a change in the shape and/or size of the measuring tube cross-sectional area in the course of the first signal path and the second signal path,
- that the first ultrasonic transducer is arranged on the first half of the measuring tube and that the third ultrasonic transducer is arranged on the second half of the measuring tube,
- that the first ultrasonic transducer pair and the second ultrasonic transducer pair are arranged on the measuring tube such that the first measuring plane and the second measuring plane are not aligned parallel to one another.

The ultrasonic flowmeter is particularly preferably designed according to one of the configurations described above.

The described design of the measuring tube as part of the flow channel allows the inlet region of the shut-off device to be optimized with respect to the separation of vortices that interfere with the flow measurement, wherein in combination with the arrangement of the ultrasonic transducers according to the invention, the accuracy of the flow measurement can be increased and thus the functioning of the shut-off device can also be improved.

BRIEF DESCRIPTION OF THE DRAWINGS

In detail, there are now a multitude of possibilities for designing and further developing the ultrasonic flowmeter according to the invention, the use according to the invention and the shut-off device according to the invention. For this, reference is made to the following description of preferred embodiments in connection with the drawings.

DETAILED DESCRIPTION

Figure 1:
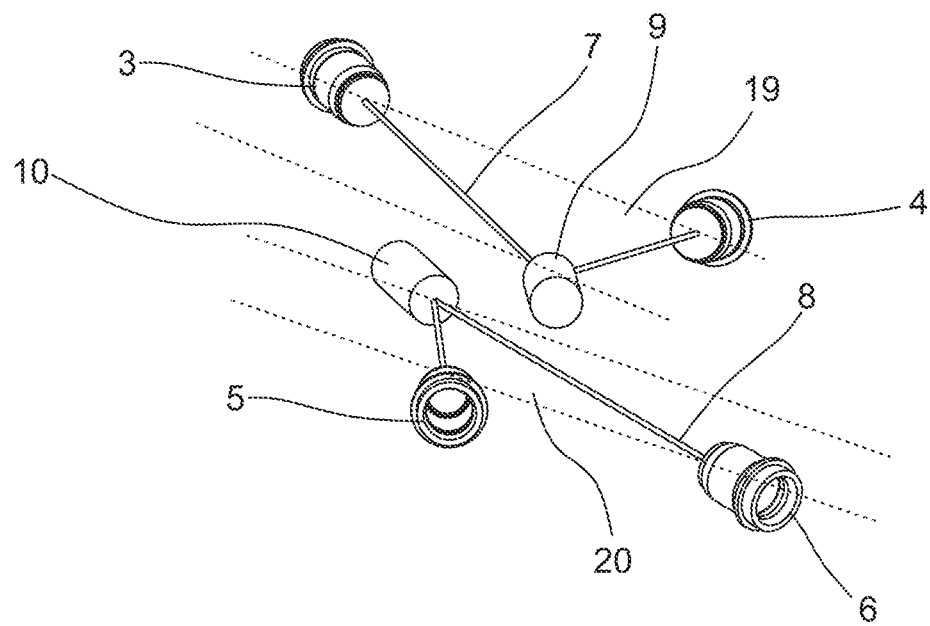
FIG. 1 illustrates a first arrangement of a first ultrasonic transducer pair and a second ultrasonic transducer pair according to the invention.

FIG. 1 shows a first arrangement of a first ultrasonic transducer pair 3, 4 with a first ultrasonic transducer 3 and a second ultrasonic transducer 4 and a second ultrasonic transducer pair 5, 6 with a third ultrasonic transducer 5 and a fourth ultrasonic transducer 6, wherein each ultrasonic transducer 3, 4, 5, 6 is designed as an ultrasonic transmitter and as an ultrasonic receiver. The arrangement shown is suitable for use in an ultrasonic flowmeter 1 according to the invention.

A V-shaped first signal path 7 is formed between the first ultrasonic transducer 3 and the second ultrasonic transducer 4, wherein the first signal path 7 defines a first measuring plane 19. In addition, the first signal path 7 runs over a reflection element with a reflecting surface 9.

The second V-shaped signal path 8 is formed between the third ultrasonic transducer 5 and the fourth ultrasonic transducer 6, which defines a second measuring plane 20. The second signal path 8 also runs over a reflection element with a reflecting surface 10.

The measuring planes 19, 20 spanned by the signal paths 7 and 8 are aligned such that they are not parallel to each other. In the embodiment shown, the distance of the measuring planes 19, 20 decreases in the course of the measuring distance between the ultrasonic transducers 3 and 4 or 5 and 6.

Figure 2:
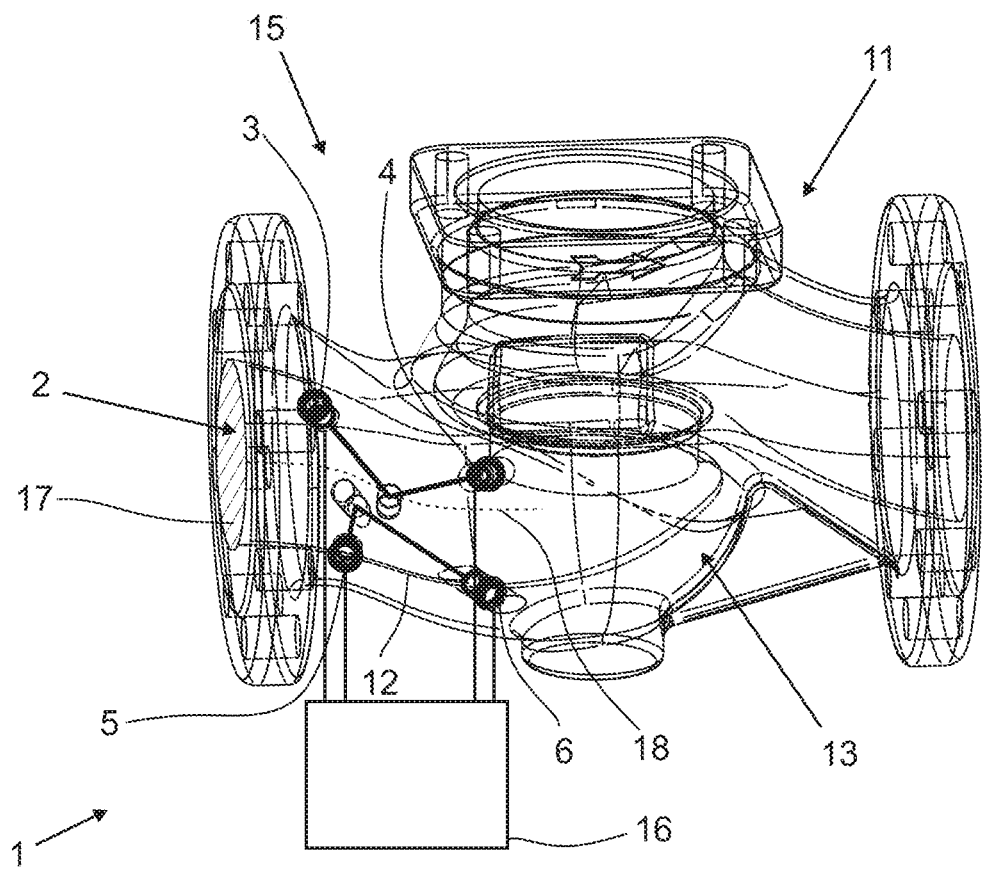
FIG. 2 illustrates a first embodiment of an ultrasonic flowmeter, an application and a shut-off device according to invention.

FIG. 2 shows the application of the arrangement of the first ultrasonic transducer pair 3, 4 and the second ultrasonic transducer pair 5, 6 shown in FIG. 1 in an ultrasonic flowmeter 1 as well as the use of the ultrasonic flowmeter 1 in a shut-off device 11.

The shut-off device 11 has a flow channel 12 and a blocking device 13 arranged in the flow channel 12, wherein the blocking device 13 has a blocking body receptacle and a blocking body which is movable in the blocking body receptacle and which is not shown here, wherein the flow cross-section for the medium in the blocking device 13 and thus in the flow channel 12 can be changed by moving the blocking body in the blocking body receptacle, wherein the flow channel 12 has an inlet region 15 upstream of the blocking device 13, viewed in the direction of flow.

In the shut-off device 11 shown, the flow channel 12, in detail the inlet region 15, is designed as a measuring tube 2 of the ultrasonic flowmeter 1. The first ultrasonic transducer pair 3, 4 and the second ultrasonic transducer pair 5, 6 are mounted in the inlet region 15 on the flow channel 12 according to the arrangement described in FIG. 1.

In addition, the measuring tube 2 has a measuring tube cross-section 17 which changes both in shape and size in the course of the measuring section between the ultrasonic transducer pairs 3, 4, 5, 6. In detail, the measuring tube cross-section 17 is essentially round, i.e. circular, in the area in front of the first ultrasonic transducer 3 and the third ultrasonic transducer 5. In the course of the measuring section the measuring tube cross-section 17 changes continuously. In the area of the second ultrasonic transducer 4 and the fourth ultrasonic transducer 6, the measuring tube cross-section 17 is essentially oval, whereby the size of the measuring tube cross-sectional area 17 decreases in the course of the measuring section. In detail, the measuring tube cross-section 17 has two circular arcs, the radii of which increase at different rates in the course of the measuring section (see FIG. 6), so that overall there is a flattening of the measuring tube cross-section and a widening of the measuring tube cross-sectional area 17.

The measuring tube axis 18 and the measuring tube 2 are bent in the illustrated embodiment in the region of the measuring section.

The flow channel 12 and the measuring tube 2 are designed such that the separation of vortices of the medium is minimized during operation.

In addition, the ultrasonic flowmeter 1 shown has a control and evaluation unit 16 which determines the flow of a flowing medium based on at least the two ultrasonic signals.

Figure 3:
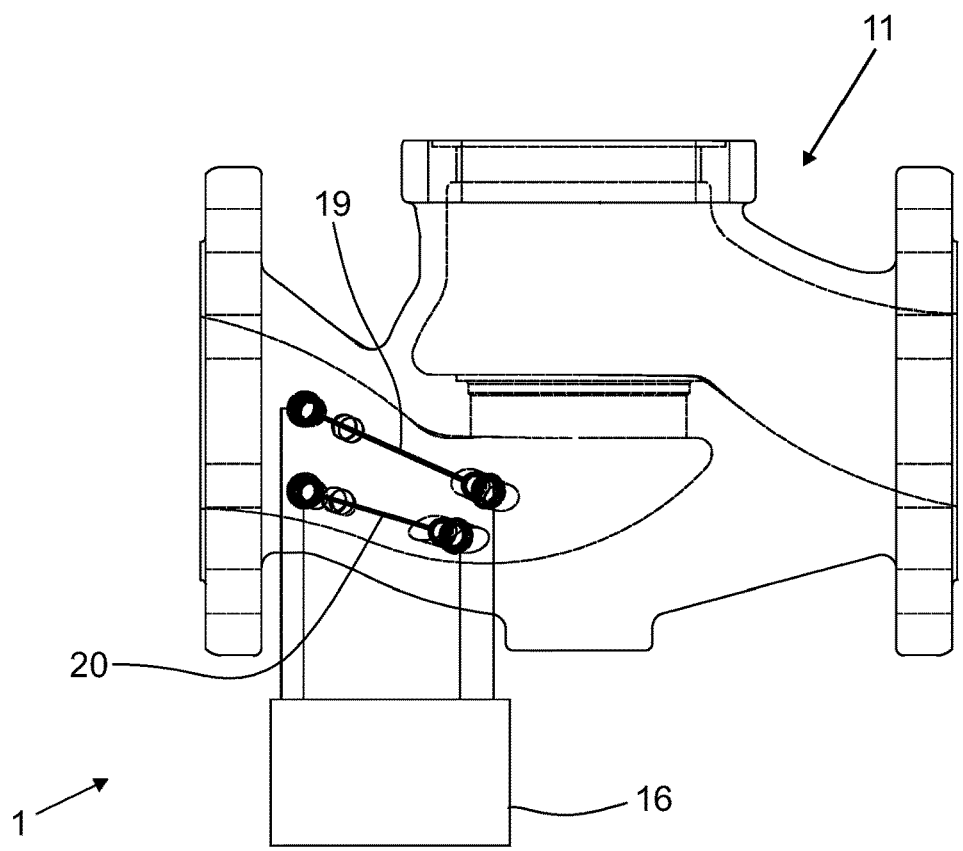
FIG. 3 illustrates the embodiment shown in FIG. 2 in side view.

FIG. 3 shows the arrangement shown in FIG. 2 in side view. This illustration clearly shows that the distance between the measuring planes 19 and 20, which are spanned by signal paths 7 and 8, decreases as the measuring section progresses.

Figure 4:
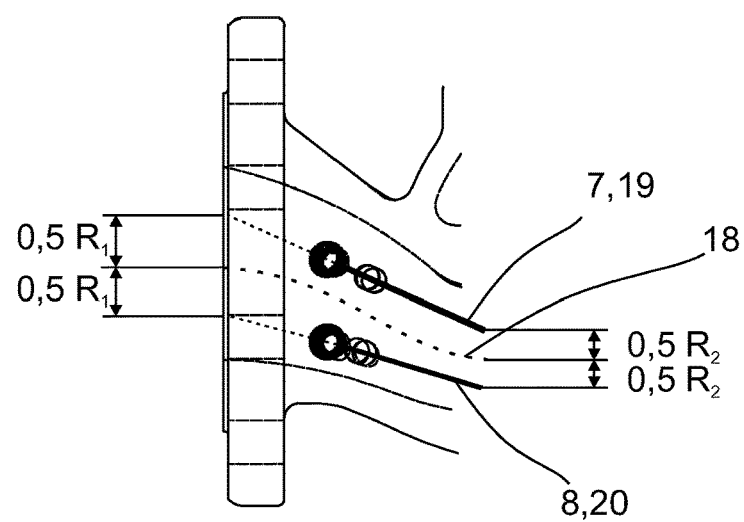
FIG. 4 illustrates an embodiment of an enlarged view of the signal path.

FIG. 4 shows a further course of the first signal path 7 and the second signal path 8 or the first measuring plane 19 and the second measuring plane 20. The illustration shows that the measuring planes 19, 20, which are spanned by both pairs of ultrasonic transducers, run towards each other in the course of the measuring section on the one hand and are arranged at the same distance from the measuring tube axis 18 on the other hand. In the illustration, R1 denotes the radius of the measuring tube cross-section 17 in the area in front of the first ultrasonic transducer 3 and the third ultrasonic transducer 5 and R2 denotes the radius of the measuring tube cross-section 17, or half the height of the measuring tube cross-section 17 in the case of an oval shape, in the area just before the second ultrasonic transducer 4 and the fourth ultrasonic transducer 6.

Figure 5:
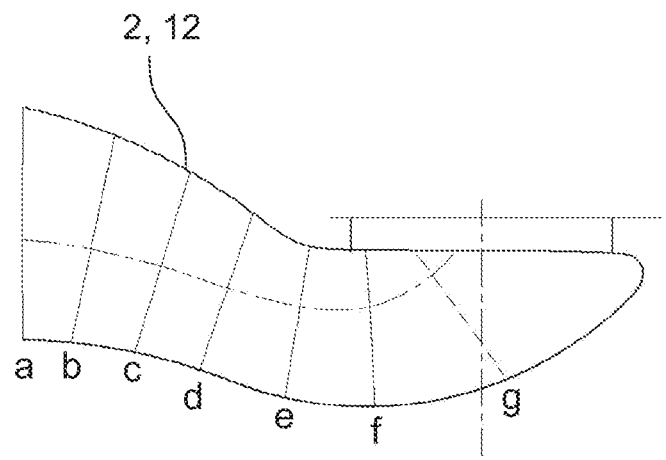
FIG. 5 illustrates a measuring tube or a flow channel in side view.
Figure 6:
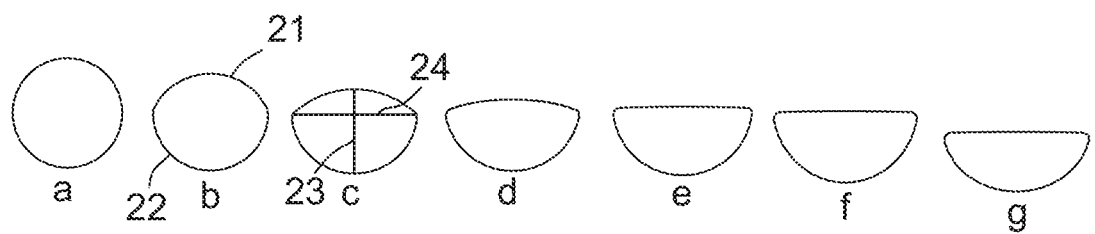
FIG. 6 illustrates the course of the measuring tube cross-sectional area of the measuring tube or flow channel shown in FIG. 5.

FIG. 5 shows an example of the design of a measuring tube 2 or a flow channel 12 upstream of the blocking device 13, wherein different sections a to g are marked for comparison with FIG. 6. The ultrasonic transducers 3 and 5 are arranged approximately in the section between b and c during operation, the ultrasonic transducers 4 and 6 are arranged approximately in the section between e and f during operation.

FIG. 6 now shows the course of the measuring tube cross-section or the cross-section of the flow channel between the areas a to f. The illustration shows that the measuring tube cross-section 17 is initially circular in shape and is continuously oval in the course of the measuring section or flow channel. For this, the measuring tube cross-section has a first upper circular arc 21 and a second lower circular arc 22, the radii of which become continuously larger in the course of the measuring section, wherein the radius of the first circular arc 21 becomes larger faster than the radius of the second circular arc 22. The two circular arcs 21 and 22 are continuously connected to each other by means of transition sections. Due to the flattening of the measuring tube cross-section, the latter has a height 23 and a width 24 in the course of the measuring section, wherein the height 23 in the embodiment shown is defined by the distance between the vertices of the first circular arc 21 and the second circular arc and wherein the width 24 of the measuring tube cross-section 17 is defined by the largest distance of the transition sections between the first circular arc 21 and the second circular arc 22. This design has the advantage that a detachment of vortices in the area of the measuring section can be reduced, whereby in combination with the arrangement of the ultrasonic transducers 3, 4, 5, 6 according to the invention, the determination of the velocity of the medium can be improved.

As a result, all figures show embodiments of the invention, wherein the flow can be determined particularly reliably even in demanding situations in which the flow profile is strongly disturbed due to a variation in the measuring tube, in particular by the arrangement of the ultrasonic transducer pairs according to the invention.

The invention claimed is:

1. An ultrasonic flowmeter, comprising:
a measuring tube;
a first ultrasonic transducer pair comprising a first ultrasonic transducer and a second ultrasonic transducer; and
a second ultrasonic transducer pair including a third ultrasonic transducer and a fourth ultrasonic transducer, wherein each ultrasonic transducer is designed as an ultrasonic transmitter and/or as an ultrasonic receiver,
wherein the first ultrasonic transducer pair is arranged on the measuring tube offset as viewed in a direction of flow such that the respective transmitter transmits an ultrasonic signal in the direction of flow or against the direction of flow during operation, and that the receiver receives the ultrasonic signal transmitted by the transmitter, wherein the course of the ultrasonic signal between the first ultrasonic transducer and the second ultrasonic transducer defines a first signal path, wherein the first signal path defines a first measuring plane;
wherein the second ultrasonic transducer pair is arranged on the measuring tube offset as viewed in the direction of flow such that the respective transmitter transmits an ultrasonic signal in the direction of flow or against the direction of flow during operation, and that the receiver receives the ultrasonic signal transmitted by the transmitter, wherein the course of the ultrasonic signal between the third ultrasonic transducer and the fourth ultrasonic transducer defines a second signal path, wherein the second signal path defines a second measuring plane;
wherein the measuring tube has a measuring tube cross-sectional area and a measuring tube axis;

wherein the measuring tube includes a first half of the measuring tube and a second half of the measuring tube;

wherein the first half of the measuring tube is formed by a first circumferential half extending in the longitudinal direction of the measuring tube, and the second half of the measuring tube is formed by a second circumferential half extending in the longitudinal direction of the measuring tube;

wherein, in each cross-section perpendicular to the measuring tube axis, the first half of the measuring tube has a first circumference, the second half of the measuring tube has a second circumference, and the first circumference and the second circumference have a same magnitude;

wherein the measuring tube exhibits a change in the shape and/or size of the measuring tube cross-sectional area in the course of the first signal path and the second signal path;

wherein the first ultrasonic transducer is arranged on the first half of the measuring tube, and the third ultrasonic transducer is arranged on the second half of the measuring tube;

wherein the first ultrasonic transducer pair and the second ultrasonic transducer pair are arranged on the measuring tube such that the first measuring plane and the second measuring plane are not aligned parallel to one another; and wherein the first signal path is entirely above the measuring tube axis and the second signal path is entirely below the measuring tube axis.

2. The ultrasonic flowmeter according to claim 1, wherein the first ultrasonic transducer pair and the second ultrasonic transducer pair are arranged on the measuring tube such that, in the course of the measuring section between the ultrasonic transducers, the distance of the first measuring plane from the measuring tube axis essentially corresponds to the distance of the second measuring plane from the measuring tube axis.

3. The ultrasonic flowmeter according to claim 1, wherein the ultrasonic transducers are arranged such that the distance between the first measuring plane and the second measuring plane decreases at least in sections in the course of the measuring tube axis.

4. The ultrasonic flowmeter according to claim 1, wherein the ultrasonic transducers are arranged such that the distance between the first measuring plane and the second measuring plane increases at least in sections in the course of the measuring tube axis.

5. The ultrasonic flowmeter according to claim 1, wherein the first signal path has a reflecting surface, and the second signal path has a reflecting surface.

6. The ultrasonic flowmeter according to claim 1, wherein the first signal path is essentially V-shaped, and the second signal path is essentially V-shaped.

7. The ultrasonic flowmeter according to claim 1, wherein the first ultrasonic transducer pair is arranged on the first half of the measuring tube, and the second ultrasonic transducer pair is arranged on the second half of the measuring tube.

8. The ultrasonic flowmeter according to claim 1, wherein the measuring tube has a cross-sectional reduction in the course of the first signal path and the second signal path.

9. The ultrasonic flowmeter according to claim 1, wherein the measuring tube has a cross-sectional expansion in the course of the first signal path and the second signal path.

10. The ultrasonic flowmeter according to claim 1, wherein the measuring tube cross-sectional area is essentially round in the region or upstream of the region of the first ultrasonic transducer and the third ultrasonic transducer, and the measuring tube cross-sectional area is essentially oval in the region of the second ultrasonic transducer and the fourth ultrasonic transducer.

11. The ultrasonic flowmeter according to claim 1, wherein the first ultrasonic transducer of the first ultrasonic transducer pair and the third ultrasonic transducer of the second ultrasonic transducer pair are arranged on the circumference of a first measuring tube cross-sectional area, and the second ultrasonic transducer of the first ultrasonic transducer pair and the fourth ultrasonic transducer of the second ultrasonic transducer pair are arranged on the circumference of a second measuring tube cross-sectional area.

12. The ultrasonic flowmeter according to claim 1, wherein the measuring tube axis is formed curved at least in sections.

13. The ultrasonic flowmeter according to claim 1, wherein the first ultrasonic transducer pair and the second ultrasonic transducer pair are arranged on the measuring tube such that, in the course of the measuring section between the ultrasonic transducers, the distance of the first measuring plane from the measuring tube axis essentially corresponds to the distance of the second measuring plane from the measuring tube axis; and wherein the ultrasonic transducers are arranged such that the distance between the first measuring plane and the second measuring plane changes at least in sections in the course of the measuring tube axis.

14. The ultrasonic flowmeter according to claim 1, wherein in the course of the measuring section between the ultrasonic transducers, the measuring tube cross-section changes continuously.

15. The ultrasonic flowmeter according to claim 1, wherein the measuring tube cross-section has a first upper arc and a second lower arc; and wherein the radius of the first upper arc and the radius of the second lower arc change in the course of the measuring section.

16. The ultrasonic flowmeter according to claim 15, wherein the radius of the first upper arc and the radius of the second lower arc change at different rates in the course of the measuring section.

17. A method of using an ultrasonic flowmeter in a shut-off device, comprising:

providing a shut-off device having a flow channel and a blocking device arranged in the flow channel, wherein the blocking device has a blocking body receptacle and a blocking body movable in the blocking body receptacle, wherein the flow cross-section for the medium in the blocking device and thus in the flow channel can be changed by moving the blocking body in the blocking body receptacle, wherein the flow channel has an inlet region upstream of the blocking device as viewed in a direction of flow;

providing an ultrasonic flowmeter having a measuring tube, a first ultrasonic transducer pair comprising a first ultrasonic transducer and a second ultrasonic transducer, and a second ultrasonic transducer pair including a third ultrasonic transducer and a fourth ultrasonic transducer, wherein each ultrasonic transducer is designed as an ultrasonic transmitter and/or as an ultrasonic receiver;

arranging the first ultrasonic transducer pair on the measuring tube offset as viewed in the direction of flow such that, during operation, the respective transmitter transmits an ultrasonic signal in the direction of flow or against the direction of flow, and that the receiver receives the ultrasonic signal transmitted by the transmitter, wherein the course of the ultrasonic signal between the first ultrasonic transducer and the second ultrasonic transducer defines a first signal path, wherein the first signal path defines a first measuring plane;

arranging the second ultrasonic transducer pair on the measuring tube offset as viewed in the direction of flow such that, during operation, the respective transmitter transmits an ultrasonic signal in the direction of flow or against the direction of flow, and that the receiver receives the ultrasonic signal transmitted by the transmitter, wherein the course of the ultrasonic signal defines a second signal path between the third ultrasonic transducer and the fourth ultrasonic transducer, wherein the second signal path defines a second measuring plane;

wherein the measuring tube of the ultrasonic flowmeter is formed at least as part of the flow channel;

wherein the measuring tube has a measuring tube cross-sectional area and a measuring tube axis;

wherein the measuring tube includes a first half of the measuring tube and a second half of the measuring tube;

wherein the first half of the measuring tube is formed by a first circumferential half extending in the longitudinal direction of the measuring tube, and the second half of the measuring tube is formed by a second circumferential half extending in the longitudinal direction of the measuring tube;

wherein, in each cross-section perpendicular to the measuring tube axis, the first half of the measuring tube has a first circumference, the second half of the measuring tube has a second circumference, and the first circumference and the second circumference have a same magnitude;

wherein the measuring tube exhibits a change in the shape and/or size of the measuring tube cross-sectional area in the course of the first signal path and the second signal path;

wherein the first ultrasonic transducer is arranged on the first half of the measuring tube and the third ultrasonic transducer is arranged on the second half of the measuring tube;

wherein the first ultrasonic transducer pair and the second ultrasonic transducer pair are arranged on the measuring tube such that the first measuring plane and the second measuring plane are not aligned parallel to one another; and wherein the first signal path is entirely above the measuring tube axis and the second signal path is entirely below the measuring tube axis.

18. The method according to claim 17, further comprising arranging the ultrasonic transducers such that the distance between the first measuring plane and the second measuring plane changes at least in sections in the course of the measuring tube axis.

19. A shut-off device, comprising:
an ultrasonic flowmeter;
a flow channel; and
a blocking device arranged in the flow channel, wherein the blocking device has a blocking body receptacle and a blocking body movable in the blocking body receptacle, wherein the flow cross-section for the medium in the blocking device and thus in the flow channel can be changed by moving the blocking body in the blocking body receptacle, wherein the flow channel has an inlet region upstream of the blocking device as viewed in a direction of flow;

wherein the ultrasonic flowmeter has a measuring tube, a first ultrasonic transducer pair comprising a first ultrasonic transducer and a second ultrasonic transducer, and a second ultrasonic transducer pair including a third ultrasonic transducer and a fourth ultrasonic transducer, wherein each ultrasonic transducer is designed as an ultrasonic transmitter and/or as an ultrasonic receiver;

wherein the first ultrasonic transducer pair is arranged on the measuring tube offset as viewed in the direction of flow such that, during operation, the respective transmitter transmits an ultrasonic signal in the direction of flow or against the direction of flow, and that the receiver receives the ultrasonic signal transmitted by the transmitter, wherein the course of the ultrasonic signal between the first ultrasonic transducer and the second ultrasonic transducer defines a first signal path, wherein the first signal path defines a first measuring plane;

wherein the second ultrasonic transducers pair is arranged on the measuring tube offset as viewed in the direction of flow such that, during operation, the respective transmitter transmits an ultrasonic signal in the direction of flow or against the direction of flow, and that the receiver receives the ultrasonic signal transmitted by the transmitter, wherein the course of the ultrasonic signal defines a second signal path between the third ultrasonic transducer and the fourth ultrasonic transducer, wherein the second signal path defines a second measuring plane;

wherein the measuring tube of the ultrasonic flowmeter is formed at least as part of the flow channel;

wherein the measuring tube has a measuring tube cross-sectional area and a measuring tube axis;

wherein the measuring tube includes a first half of the measuring tube and a second half of the measuring tube;

wherein the first half of the measuring tube is formed by a first circumferential half extending in the longitudinal direction of the measuring tube, and the second half of the measuring tube is formed by a second circumferential half extending in the longitudinal direction of the measuring tube;

wherein, in each cross-section perpendicular to the measuring tube axis, the first half of the measuring tube has a first circumference, the second half of the measuring tube has a second circumference, and the first circumference and the second circumference have a same magnitude;

wherein the measuring tube exhibits a change in the shape and/or size of the measuring tube cross-sectional area in the course of the first signal path and the second signal path;

wherein the first ultrasonic transducer is arranged on the first half of the measuring tube, and the third ultrasonic transducer is arranged on the second half of the measuring tube;

wherein the first ultrasonic transducer pair and the second ultrasonic transducer pair are arranged on the measuring tube such that the first measuring plane and the second measuring plane are not aligned parallel to one another; and wherein the first signal path is entirely above the measuring tube axis and the second signal path is entirely below the measuring tube axis.

20. The shut-off device according to claim 19, wherein the ultrasonic flowmeter is designed such that the distance between the first measuring plane and the second measuring plane changes at least in sections in the course of the measuring tube axis.

\* \* \* \* \*